United States Patent [19]

Komatsu et al.

[11] Patent Number: 5,764,442
[45] Date of Patent: Jun. 9, 1998

[54] ROTARY HEAD DRUM WITH SHIELDING OF HEADS AND ROTARY TRANSFORMERS

[75] Inventors: Izumi Komatsu; Kiyohiko Ushiyama; Isao Ushikoshi; Masataka Kurata, all of Nagano, Japan

[73] Assignee: Kabushiki Kaisha Sankyo Seiko Seisakusho, Nagano, Japan

[21] Appl. No.: 770,828

[22] Filed: Dec. 20, 1996

Related U.S. Application Data

[63] Continuation of Ser. No. 500,093, Jul. 10, 1995, abandoned, which is a continuation of Ser. No. 107,118, Aug. 17, 1993, abandoned.

[51] Int. Cl.[6] ............................... G11B 5/52; G11B 5/10
[52] U.S. Cl. ............................... 360/107; 360/130.24
[58] Field of Search ............................... 360/107, 108, 360/84, 130.22, 130.23, 130.24

[56] References Cited

U.S. PATENT DOCUMENTS

| | | | |
|---|---|---|---|
| 3,995,317 | 11/1976 | Schmidt | 360/107 |
| 4,031,558 | 6/1977 | Kusaka | 360/108 |
| 4,251,840 | 2/1981 | Maruyama et al. | 360/107 |
| 4,654,738 | 3/1987 | Kato et al. | 360/108 |
| 4,706,143 | 11/1987 | Asada et al. | 360/107 |
| 4,939,607 | 7/1990 | Saito | 360/107 |
| 5,010,432 | 4/1991 | Fukushima et al. | 360/107 |
| 5,019,926 | 5/1991 | Van Thuijl et al. | 360/107 |
| 5,392,180 | 2/1995 | Hasegawa | 360/130.24 |

FOREIGN PATENT DOCUMENTS

| | | | |
|---|---|---|---|
| 0232834 | 2/1987 | European Pat. Off. | |
| 55-153125 | 11/1980 | Japan | |
| 62-185547 | 8/1987 | Japan | |
| 62-214508 | 9/1987 | Japan | 360/107 |
| 63-228408 | 9/1988 | Japan | 360/130.24 |
| 0250814 | 4/1990 | Japan | |
| 2-148402 | 6/1990 | Japan | 360/130.24 |
| 3-132912 | 6/1991 | Japan | |
| 3-288309 | 12/1991 | Japan | |
| 4-353612 | 12/1992 | Japan | |
| 5-205201 | 8/1993 | Japan | |

*Primary Examiner*—Stuart S. Levy
*Assistant Examiner*—David L. Ometz
*Attorney, Agent, or Firm*—Sughrue, Mion, Zinn, Macpeak & Seas, PLLC

[57] ABSTRACT

A rotary cylinder device has a stationary cylinder with a stationary shaft; a rotary cylinder rotatably mounted on the stationary shaft, the rotary cylinder having an opening on one side thereof which is opposite to the other side where the rotary cylinder confronts with the stationary cylinder; a signal recording and reproducing magnetic head provided on the periphery of the rotary cylinder; an electric motor including: a rotor member of the electric motor, which is provided in the opening of the rotary cylinder and secured to the rotary cylinder; a stator member of the electric motor, which is confronted with the rotor member; and a first magnetic shielding member arranged to cover the opening of the rotary cylinder.

12 Claims, 7 Drawing Sheets

ROTARY HEAD DRUM WITH SHIELDING OF HEADS AND ROTARY TRANSFORMERS

This is a Continuation of Application No. 08/50,093, filed July 10, 1995, now abandoned, which in turn is a Continuation of Application No. 08/107,118, filed August 17, 1993, now abandoned.

BACKGROUND OF THE INVENTION

1. Field of the Invention

This invention relates to a rotary cylinder device used in a video tape recorder (VTR) or a digital audio tape recorder (DAT), and more particularly to the structure of an electric motor for rotating a rotary cylinder in the rotary cylinder device.

2. Related Art

One example of a magnetic recording and reproducing device, such as a video tape recorder, is a helical scanning type rotary cylinder device in which a magnetic tape is spirally wound on a rotary cylinder with a magnetic head. The magnetic head scans the magnetic tape obliquely to record and reproduce data signals.

Figure 10:
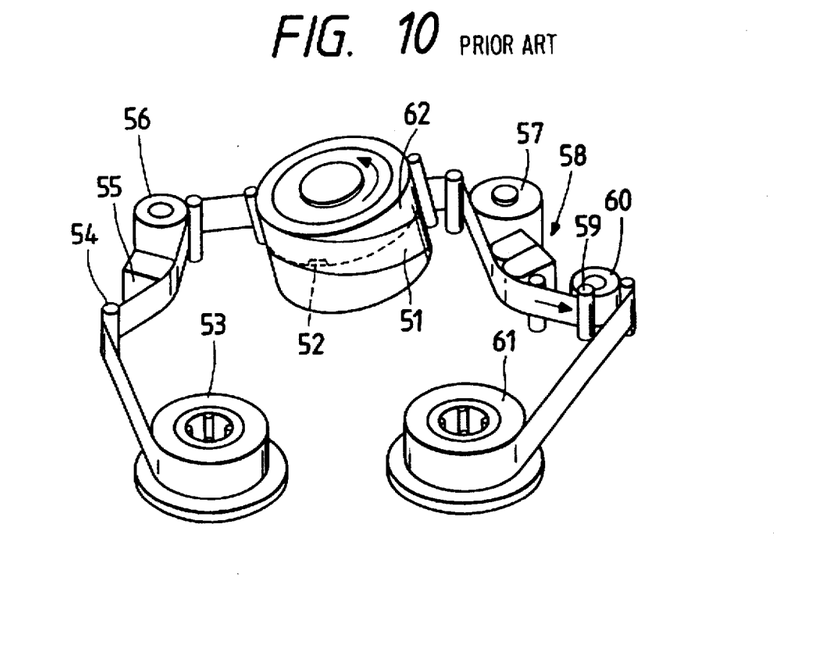
FIG. 10 is a showing of an arrangement of a general rotary cylinder device and a tape driving system.

FIG. 10 outlines the arrangement of a general rotary cylinder device and a tape driving system around it. A magnetic tape 51 is supplied from a tape supplying reel 53, and led through a back tension post 54, a full-width erasing head 55, an impedance roller 56, a vertical guide and an inclined guide to a magnetic head 52 with a rotary cylinder device.

The rotary cylinder device is mounted so that it forms a predetermined angle the base of the video tape recorder. Therefore, the magnetic tape 51 is obliquely wound on the slide surface 62 of the rotary and stationary cylinders over a predetermined angle. The magnetic tape 51 thus wound is led through an inclined guide, a vertical guide, an impedance roller 57, an audio head assembly 58 comprising an audio erasing head and an audio control head, a capstan 59 and a pinch roller 60 to a tape winding reel 61, on which it is wound.

Now, the structure of the rotary cylinder device will be described.

Figure 11:
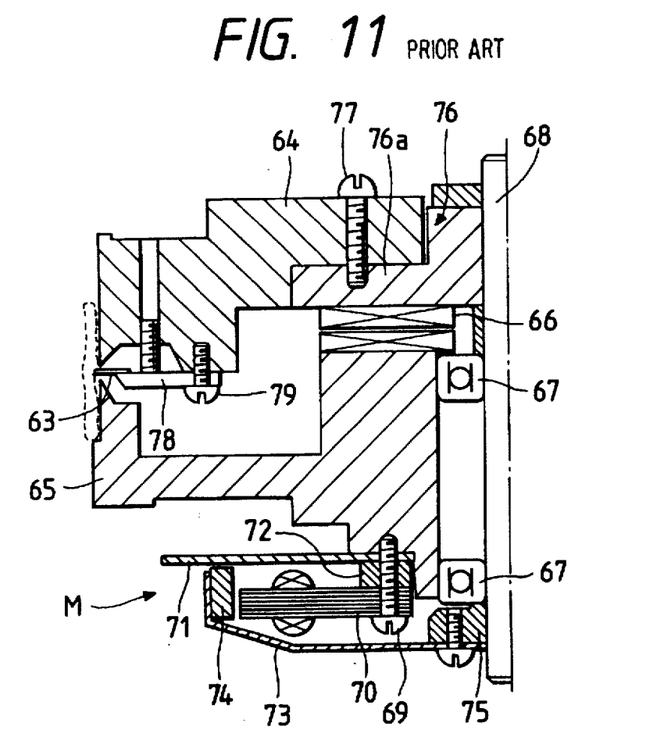
FIG. 11 is a showing a sectional view of a rotary cylinders of a conventional art.

FIG. 11 is a sectional view of a conventional rotary cylinder device which is well known in the art. The rotary cylinder device comprises: a rotary cylinder 64 with a magnetic head 63; a stationary cylinder 65 fixedly secured to the base of a video tape recorder or the like; and connecting means, namely, a rotary transformer 66 for transmitting signals detected by the magnetic head 63 to a predetermined stationary circuit, and transmitting control signals or recording signals to the rotary section.

A pair of ball bearings 67 are fitted in an axial hole formed in the stationary cylinder 65 at the center, to rotatably support a rotary shaft 68.

The rotary cylinder device has an electric motor M connected to the lower surface of the stationary cylinder 65, to rotate the rotary shaft 68. The stator core 70 of the motor M is fixedly secured to the stationary cylinder 65 through a circuit board 71 forming a drive circuit and other circuits, and a core holder 72 with screws 69. The outer periphery of the stator core 70 is confronted with a rotor magnet assembly 74 provided on the inner cylindrical surface of the rotor yoke 73 of the motor M. The rotor magnet assembly 74 is turned by excitation of the stator core 70.

A boss 75 is provided on the rotor yoke 73 at the center. The boss 75 of the rotor yoke 73 is fixedly coupled to the lower end of the rotary shaft 68, to turn the latter.

2

A sleeve 76 is fixedly mounted on the upper end portion of the rotary shaft 68 by press fitting, welding or other suitable methods. The sleeve 76 has a flange 76a, which is fixedly connected to the rotary cylinder 64 with screws 77.

A head support 78 is secured to the lower surface of the rotary cylinder 64 with screws 79. The magnetic head 63 is supported by the head support 78 in such a manner that it is protruded a predetermined distance from the outer end of the head support 78 (the outer cylindrical surface 64a of the rotary cylinder 64).

As was described above, in the rotary cylinder device, the motor M for rotating the rotary shaft 68 is mounted on the lower surface of the stationary cylinder 65, and the rotary cylinder 64 is rotated through the rotary shaft 68 by the motor M. Hence, if a twisting resonance occurs with the rotary shaft 68, the rotation becomes irregular.

In order to eliminate this difficulty, a stationary shaft type rotary cylinder device has been disclosed by Japanese Pat. Application (OPI) No. 50814/1990. The device will be described with reference to FIG. 12.

Figure 12:
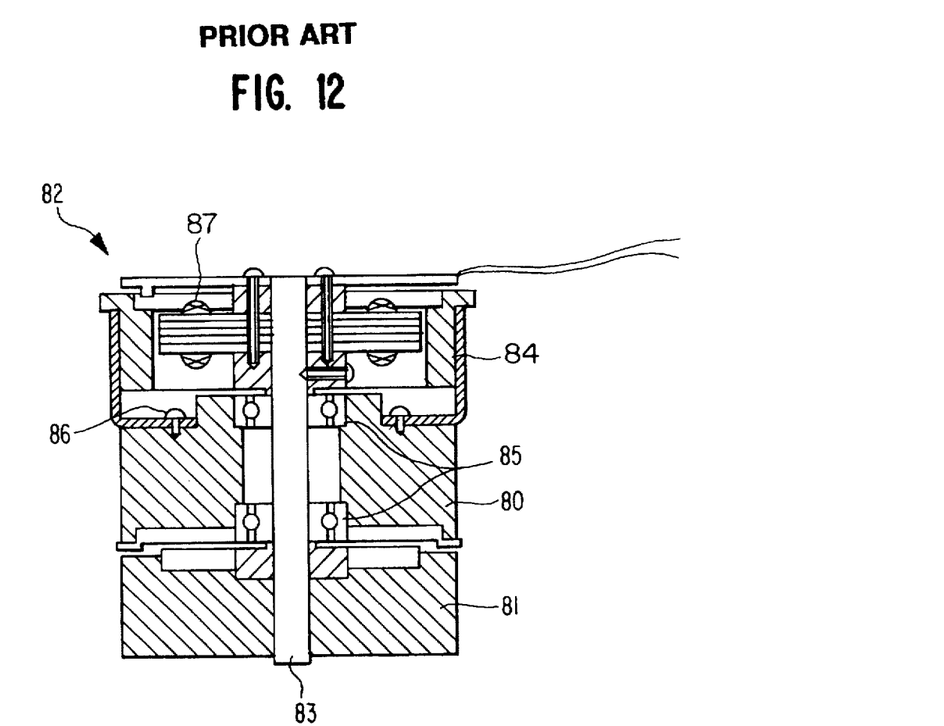
FIG. 12 shows a sectional view of a conventional rotary cylinder having a stationary shaft.

As shown in FIG. 12, an electric motor 82 for rotating a rotary cylinder is provided above in the rotary cylinder device, and the rotor section 84 of the motor is coupled directly to the rotary cylinder 80, so that the rotary cylinder 80 is rotated without use of the shaft 83.

That is, in FIG. 12, the shaft 83 is a stationary shaft secured to the stationary cylinder 81 which is secured to the chassis of a video tape recorder (not shown).

The rotary cylinder 80 is rotatably mounted through a pair of bearings 85 on the stationary shaft 83, and connected to the rotor section 84 of the motor M with screws 86.

The stator section 87 of the motor M is fixedly mounted on the stationary shaft 83 in such a manner that it is confronted with the rotor section 84. When the stator section 87 is excited, the rotor section 84 is turned, and accordingly the rotary cylinder 80 is turned.

In the rotary cylinder device, the rotary cylinder 80 is fixedly secured to the rotor section 84 as was described above, and therefore no twisting resonance occurs with the shaft. Accordingly, the device is free from jittering. That is, in the stationary shaft type rotary cylinder device, unlike the conventional rotary shaft type rotary cylinder device, the rotation of the motor M is not transmitted through the rotary shaft to the rotary cylinder. Therefore, the stationary shaft type rotary cylinder device is free from the difficulty that twisting resonance occurs with the shaft, and the rotation becomes irregular.

However, the above-described stationary shaft type rotary cylinder device suffers from the following problems:

(1) In the rotary cylinder device, the motor M is provided in the rotary cylinder; that is, it is located near the signal recording and reproducing magnetic head mounted on the rotary cylinder and audio magnetic members (not shown) provided near the device. Hence, the leakage flux of the motor M affects the magnetic members adversely, so that audio noise or image noise is increased, or the recording deteriorates.

(2) In the rotary cylinder device, the stationary cylinder, the rotary cylinder, and the drive section forming the motor M are stacked one on another in that order, and the axial dimension is substantially equal to that of the rotary shaft type rotary cylinder device. Therefore, it is difficult to reduce the thickness of the device. In addition, since the stator core of the motor M is fixedly secured to the circuit board, the device is not sufficient in mechanical strength.

(3) In the motor M constructed as described above, the rotor yoke with the drive magnets is secured to the rotary cylinder with the screws. Therefore, the device is large in the number of assembling steps and in the number of components, and accordingly high in manufacturing cost.

SUMMARY OF THE INVENTION

Accordingly, an object of this invention is to eliminate the above-described difficulties accompanying a conventional stationary shaft type rotary cylinder device. More specifically, an object of the invention is to provide a stationary shaft type rotary cylinder device in which the electric motor is reduced in thickness.

In order to achieve the foregoing object, according to the present invention, there is provided a rotary cylinder device comprising a stationary cylinder with a stationary shaft; a rotary cylinder rotatably mounted on the stationary shaft, the rotary cylinder having an opening on one side thereof which is opposite to the other side where the rotary cylinder confronts with the stationary cylinder; a signal recording and reproducing magnetic head provided on the periphery of the rotary cylinder; an electric motor including: a rotor member of the electric motor, which is provided in the opening of the rotary cylinder and secured to the rotary cylinder; a stator member of the electric motor, which is confronted with the rotor member; and a first magnetic shielding member arranged to cover the opening of the rotary cylinder.

According to the present invention, (1) the leakage flux of the motor M is magnetically blocked, so that the magnetic members around the device are prevented from being adversely affected by the leakage flux, (2) the mounting structure of the motor M is reinforced so that the rotary cylinder device can be reduced in thickness, and (3) the manufacturing cost is reduced.

DETAILED DESCRIPTION OF THE PREFERRED EMBODIMENTS

First Embodiment

An example of a rotary cylinder device, which constitutes a first embodiment of the invention, will be described with reference to FIG. 1.

Figure 1:
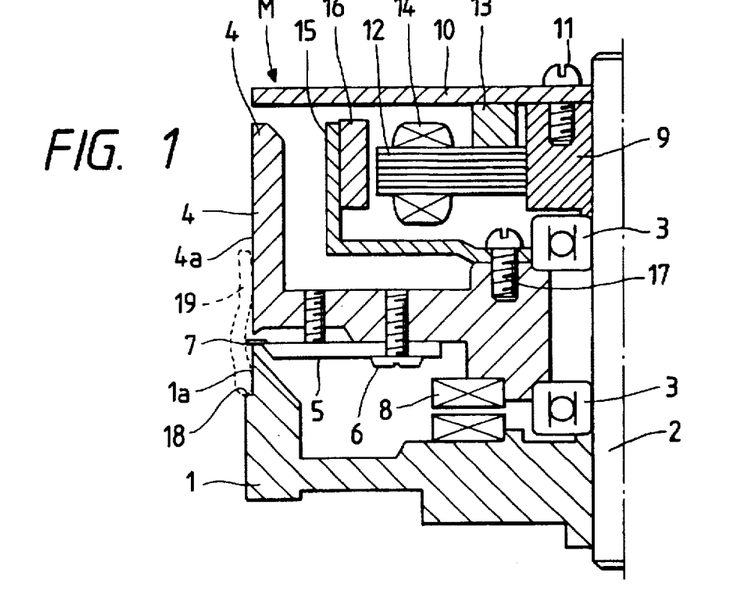
FIG. 1 is a showing a sectional view of a rotary cylinder of first embodiment of the present invention.

As shown in FIG. 1, the rotary cylinder device has a cylindrical stationary cylinder 1 having a through-hole along the central axis, into which a stationary shaft 2 is fixedly inserted by press-fitting or by welding.

A pair of ball bearings 3 and 3 are mounted on the stationary shaft 2 in such a manner that they are located above the stationary cylinder 1 and spaced a predetermined distance from each other.

More specifically, the outer races of the ball bearings 3 are fitted in axial holes which are formed in a rotary cylinder 4 at the center, so that the rotary cylinder 4 is freely rotatable around the stationary shaft 2.

A head support 5 is fixedly mounted on the lower surface of the peripheral portion of the rotary cylinder 4 with screws 6, and a signal recording and reproducing magnetic head 7 is secured to the outer periphery of the head support 5 in such a manner that it is protruded a predetermined distance from the outer cylindrical surface (slide surface) 4a of the rotary cylinder 4 and the outer cylindrical surface (slide surface) 1a of the stationary cylinder 1.

A rotary transformer 8 is provided between the central portions of the rotary cylinder 4 and the stationary cylinder 1, to transmit signals detected by the magnetic head 7 to a fixed circuit and to transmit control signals or recording signals to the rotary section.

In order to regulate the position of a magnetic tape 19 in the direction of width which is laid on the cylinders, a lead 18 is formed in the outer cylindrical surface 1a of the stationary cylinder 1.

The magnetic tape 19 is run while sliding on the outer cylindrical surface 1a of the stationary cylinder 1 and the outer cylindrical surface 4a of the rotary cylinder 4. While the magnetic tape 19 is being run in this way, the magnetic head 17 secured to the rotary cylinder 4 is turned at high speed together with the rotary cylinder 4, thus obliquely scanning the magnetic tape 19.

The rotary cylinder 4 is substantially cup-shaped, having a cylindrical recess on its one side opposite to the other side where the stationary cylinder 1 is provided. An electric motor M is provided in the cylindrical recess to rotate the rotary cylinder 4.

A boss 9 is fixedly mounted on the stationary shaft 2 in such a manner that it is located above the rotary cylinder 4 and abutted against the upper ball bearing 3, thus positioning the stator section (comprising a stator core 12, a core holder 13, and drive coils 14) of the motor M with respect to the rotor section (comprising a rotor yoke (or rotor casing) 15 and rotor magnet assembly 16) of the motor M.

A circuit board 10 is secured to the upper end face of the boss 9 with screws 11, to cover the cylindrical recess of the rotary cylinder 4.

A drive circuit for rotating the motor M, and other circuits are formed on the circuit board 10.

The circuit board 10 is a metal core type printed circuit board with a ferromagnetic member such as an iron plate as its core; that is, it can serve as a magnetic shielding member on the other hand. The circuit board 10 covers the opening of the rotor yoke 15 (described later in detail), to magnetically seal the motor.

The magnetic shielding member may be a bottom plate of ferromagnetic substance such as an iron plate or a shielding plate. In the case where the circuit board 10 is a printed circuit board whose core is of resin, a magnetic shielding member may be laid on the circuit board 10.

The stator core 12 forming the stator section of the motor M is mounted on the boss 9, and secured through the core holder 13 to the circuit board 10.

The stator core 12 has a plurality of radially protruding poles on each of which the drive coil 14 is wound a predetermined number of turns. The ends of the drive coils are electrically connected to the circuit board 10.

The outer periphery of the stator core 12 is confronted with the rotor magnet assembly 16 provided on the inner cylindrical surface of the rotor yoke 15.

The rotor yoke 15 is substantially in the form of a cup or dish opened upwardly in FIG. 1. The rotor yoke 15 is in opposition with the magnetic shielding member, namely, the circuit board 10.

The central portion of the bottom of the rotor yoke 15 is secured to the upper surface of the rotary cylinder 4 with screws 17.

When drive current is applied to the drive coils 14 to excite the stator core 12, the rotor magnet assembly 16 is turned, so that the rotary cylinder 4 is rotated through the rotor yoke 14.

Second Embodiment

Another example of the rotary cylinder device, which constitutes a second embodiment of the invention will be described with reference to FIG. 2(a), which concerns a structure for preventing the leakage of flux.

Figure 2A:
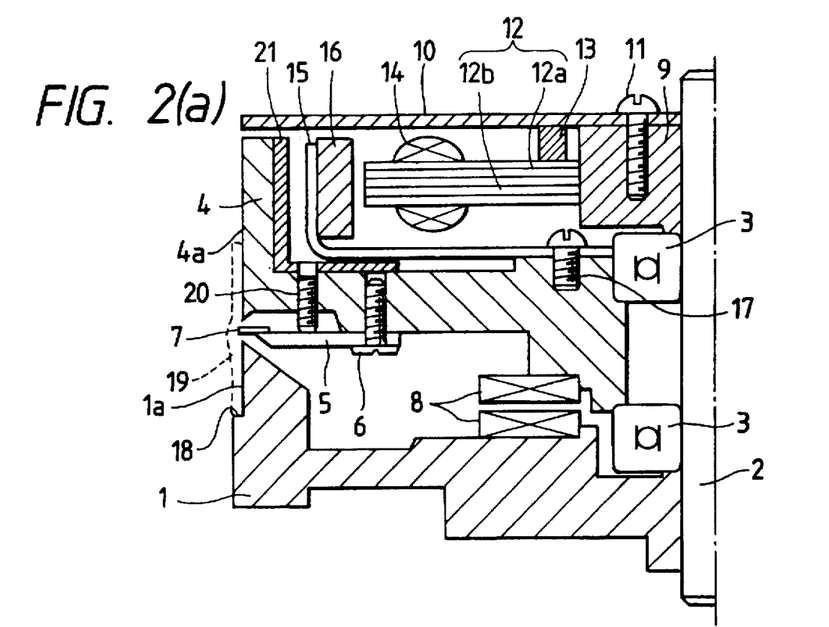
FIG. 2(a) is a showing a sectional view of a rotary cylinder of second embodiment of the present invention.

As is apparent from comparison of FIG. 2(a) with FIG. 1, the second embodiment is substantially equal in construction with the first embodiment. In FIG. 2, parts corresponding functionally to those which have been described with reference to FIG. 1 are therefore designated by the same reference numerals or characters.

A specific feature of the second embodiment resides in that a magnetic shielding member 21 is provided on the inner cylindrical surface of the rotary cylinder 4.

Figures 2B, 3:
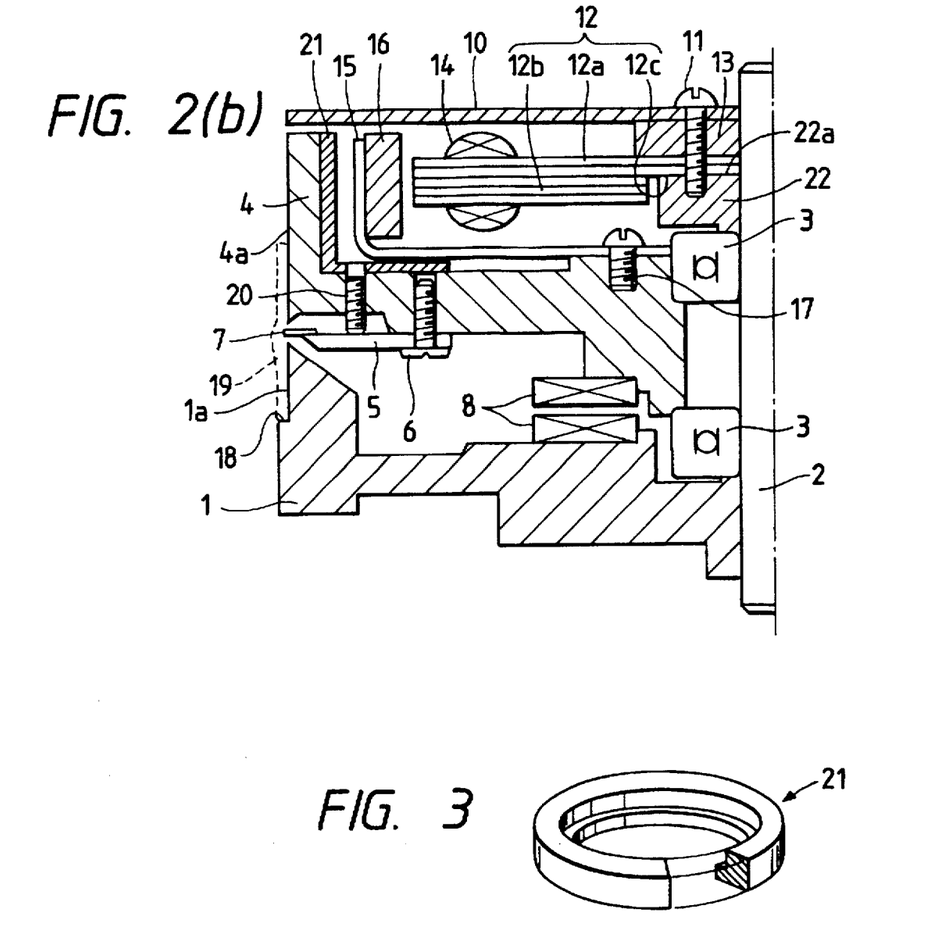
FIG. 2(b) is a showing a sectional view of a rotary cylinder of third embodiment of the present invention.
FIG. 3 is a showing a perspective view of one example of a rotor yoke of the present invention.

The magnetic shielding member 21 is in the form of a bottomed cup as shown in FIG. 3. The member 21 is secured to the inner cylindrical wall of the rotary cylinder 4 by press fitting or welding.

More specifically, the magnetic shielding member 21 is secured to the upper portion of the rotary cylinder 4, to prevent the magnetic flux of the rotor magnet assembly 16 and the rotor yoke 15 on which the rotor magnet assembly 16 are mounted, and the magnetic flux of the stator core 12 confronted with the rotor magnet assembly from flowing to the magnetic head 7 mounted fixedly on the lower surface of the rotary cylinder 4.

That is, in the second embodiment, the magnetic shielding member 21 fixedly provided on the inner cylindrical surface of the rotary cylinder 4, blocking the flow of magnetic flux as described above, shields the magnetic head 7 from magnetic noise. Accordingly, the magnetic recording and reproducing operation of the magnetic head 7 is satisfactory at all times.

In the second embodiment, the magnetic shielding member 21 can be fixedly mounted on the inner cylindrical surface of the rotary cylinder 4 readily by an ordinary method, for instance, by press-fitting or welding. That is, the rotary cylinder member according to the second embodiment can be realized without increase in manufacturing cost.

Figure 4:
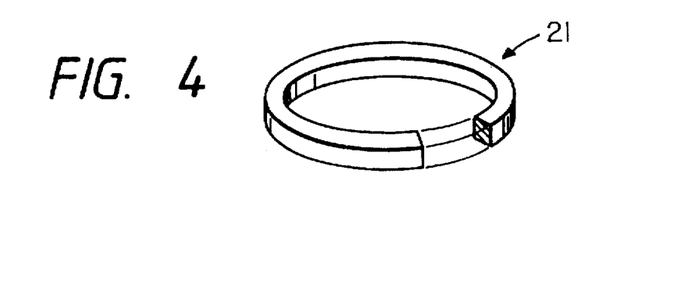
FIG. 4 is a showing a perspective view of another example of a rotor yoke of the present invention.

In the rotary cylinder member described above, the magnetic shielding member 21 is cup-shaped; however, it should be noted that the invention is not limited thereto or thereby. That is, all that is required for the magnetic shielding member 21 is to shield the magnetic head 7 from magnetic noise, and therefore it may be ring-shaped as shown in FIG. 4.

Third Embodiment

In a third embodiment of the invention as shown in FIG. 2(b), the mounting structure of the motor M is further improved; that is, it is reduced in thickness, and it can be mounted with high rigidity.

A specific feature of the third embodiment resides in a structure of fixing the stator core 12 of FIG. 2(a).

The stator core 12 is formed as follows: Silicon steel plates 12a and 12b different in inside diameter are stacked as shown in FIGS. 2(a) and (b) and joined into one unit, for instance, by crimping.

A supporting member 22 is fixedly mounted on the stationary shaft 2 in such a manner that it is located above the rotary cylinder 4.

Similarly as in the case of the above-described boss 9, the supporting member 22 is fixedly mounted on the stationary shaft 2. The supporting member 22 positions the stator section (comprising the stator core 12, the core holder 13 and the drive coils 14) of the motor M with respect to the rotor section (comprising the rotor yoke 15 and the rotor magnet assembly 16) of the latter M with its one end on the upper ball bearing 3.

The supporting member 22 has a placing section 22a on its upper surface. The placing section 22a has a flat surface perpendicular to the stationary shaft 2.

The stator core 12 has a recess 12c in its one surface which is due to the difference in inside diameter between the stator core pieces 12a and 12b. The bottom of the recess 12c is put on the placing section 22a.

The circuit board 10 is laid through the core holder 13 on the other surface of the stator core 12. That is, the stator core 12, the core holder 13, and the circuit board 10 are stacked on the supporting member 22 in that order, and fixedly secured to the supporting member 22 with screws 11.

The outer periphery of the stator core 12 is confronted with the rotor magnet assembly 16 mounted on the inner cylindrical surface of the rotor yoke 15 which is substantially in the form of a dish.

The central portion of the bottom of the rotor yoke 15 is secured to the upper surface of the rotary cylinder 4 with screws 17, so that the rotor yoke 15 is turned together with the rotary cylinder 4.

When the stator core 12 is excited, the rotor magnet assembly 16 is turned, so that the rotary cylinder 4 is turned through the rotor yoke 15.

In the third embodiment, the stator core 12 of the motor M has the recess 12c, the bottom of which is set on the placing section 22a of the supporting member; however, it should be noted that the invention is not limited thereto or thereby. That is, depending on the thickness of the stator core 12, it is unnecessary to form the recess 12c. In this case, the lower surface of the central portion of the stator core may be directly set on the placing section 22a of the supporting member. What is required is to design the stator core at least one part of which can be set on the placing section 22a of the supporting member 22. That is, the stator core may be freely changed or modified without departing from the spirit of the invention.

Fourth Embodiment

A fourth embodiment of the invention will be described with reference to FIGS. 5 through 7.

Figure 5:
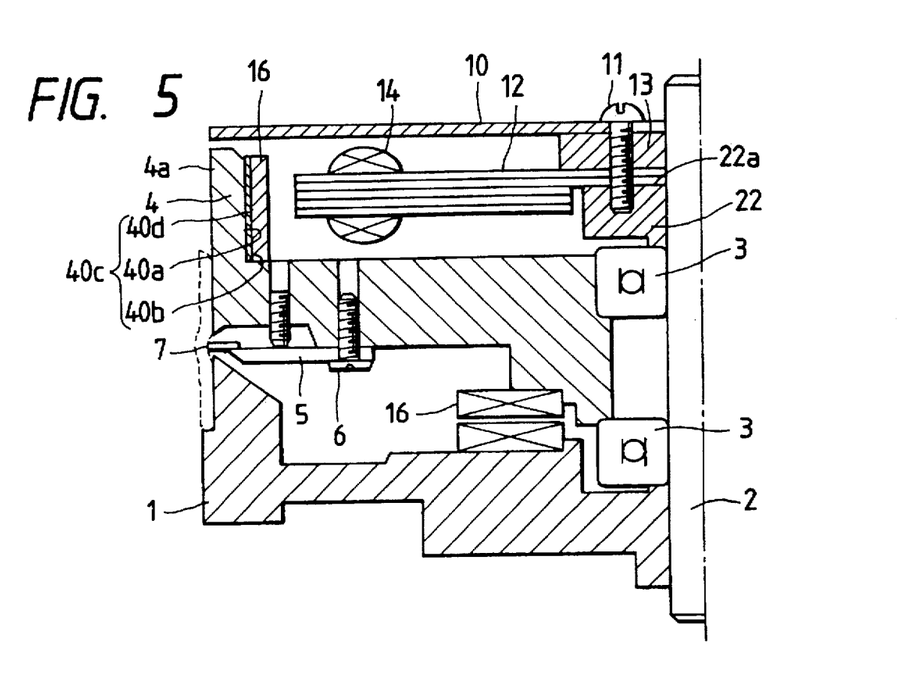
FIGS. 5 to 7 are showing sectional views of rotary cylinders of fourth embodiment of the present invention.
Figure 6:
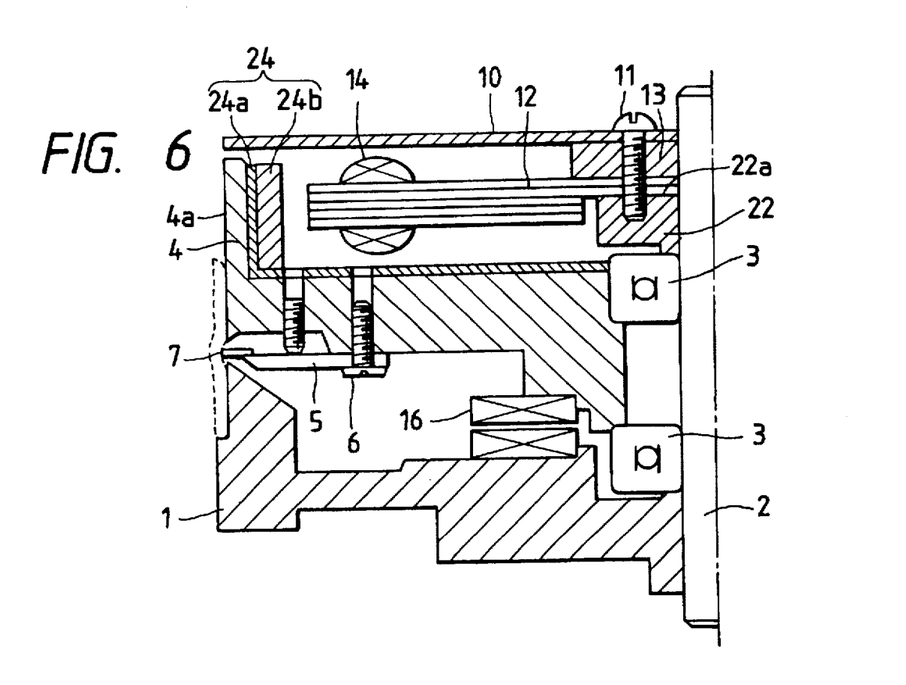
Figure 7:
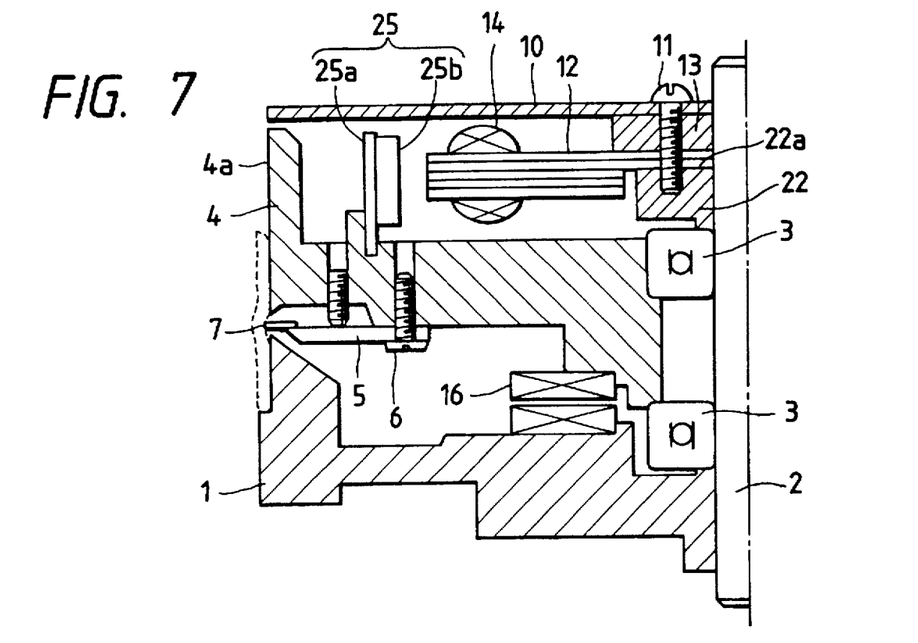

A specific feature of the fourth embodiment, as shown in FIGS. 5 through 7, resides in the structure that the rotor section of an electric motor M is mounted on a rotary cylinder.

In FIG. 5, reference numeral 4 designates the aforementioned rotary cylinder which is supported through bearings 3 on a stationary shaft 2.

The rotary cylinder 4 is a bottomed cylinder having an inner surface 40c consisting of an inner cylindrical surface 40a and a bottom surface 40b.

A supporting member 22 is fixedly mounted on the stationary shaft 2 in such a manner that it is located above the rotary cylinder 4. Supporting member 22, with its one end abutted against the upper bearing 3, positions the stator section (comprising a stator core 12, a core holder 13 and drive coils 14) of the motor M with respect to the rotor section (comprising a rotor yoke 40d and a rotor magnet assembly 16).

A circuit board 10 is fixedly secured through the stator section onto the upper surface of supporting member 22 with screws 11 in such a manner that it covers the opening of the rotary cylinder 4. A drive circuit for rotating the motor M, and other circuits are formed on the circuit board 10.

The rotor section of the motor M is provided on the inner cylindrical surface 40a of the cylindrical wall of the rotary cylinder 4, confronting through a gap with the stator section (comprising the stator core 12, the core holder 13 and the drive coils 14) of the motor M. That is, an annular yoke 40d and the rotor magnet assembly 16 are fitted in the cylindrical wall of the rotary cylinder 4. More specifically, the rotor magnet assembly 16 and the yoke 40d, which are annularly formed along the inner cylindrical surface 40a of the rotary cylinder 4, are press-fitted in the cylindrical wall of the rotary cylinder 4.

When necessary, an adhesive agent 23 may be applied between the inner cylindrical surface 40a and the rotor magnet assembly 16.

The rotary cylinder 4 is constructed as described above. As the drive coils 14 on the protruded poles of the stator section of the motor are excited selectively according to their positions, the rotor magnet assembly 16 are rotated together with the rotary cylinder.

The fourth embodiment is not always limited to what is shown in FIG. 5. It may be modified as shown in FIG. 6. That is, in the modification, a rotor magnet section 24 is formed with a bottomed-cylinder-shaped rotor yoke 24a, and an annular rotor magnet assembly 24b. The rotor magnet section 24 thus formed is fixedly fitted in the cylindrical wall of the rotary cylinder 4 so that the joint area of the inner surface 40c of the rotary cylinder 4 and the rotor magnet section 24 is increased.

In addition, the rotary cylinder device shown in FIG. 5 may be modified as shown in FIG. 7. That is, a rotor magnet section 25 is formed with a cylindrical rotor casing 25a and an annular rotor magnet assembly 25b, and the rotor magnet section 25 thus formed is fitted in an inner wall 40b which is formed, as mounting means, on the bottom wall of the rotary cylinder 4.

Fifth Embodiment

In the above-described embodiments, the motor M is so designed that magnetic flux is radially formed between the rotor section and the stator section of the motor (a peripheral confrontation type motor). However, the magnetic flux may be formed axially (a planar confrontation type motor).

Figure 8:
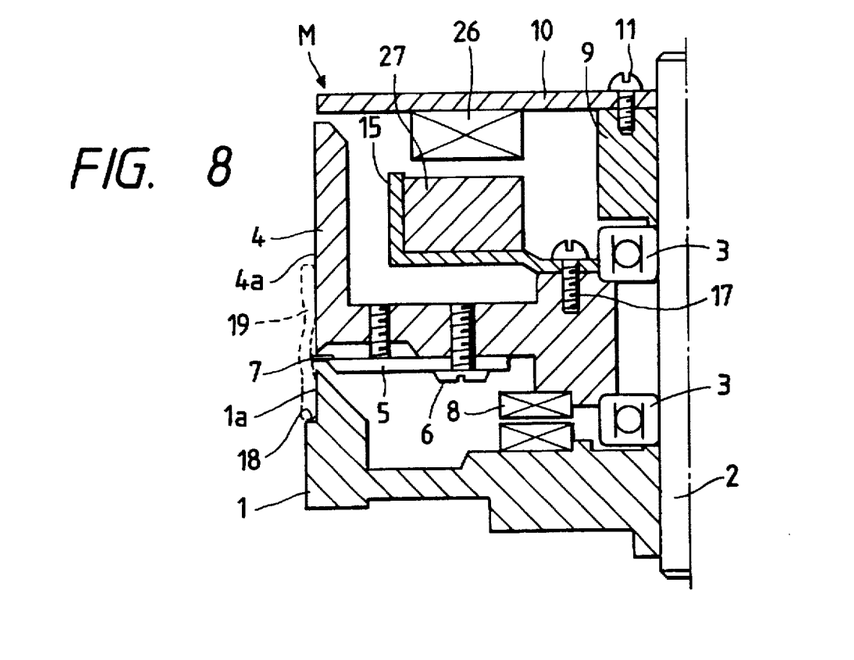
FIGS. 8 and 9 are showing sectional views of rotary cylinders of fifth embodiment of the present invention.
Figure 9:
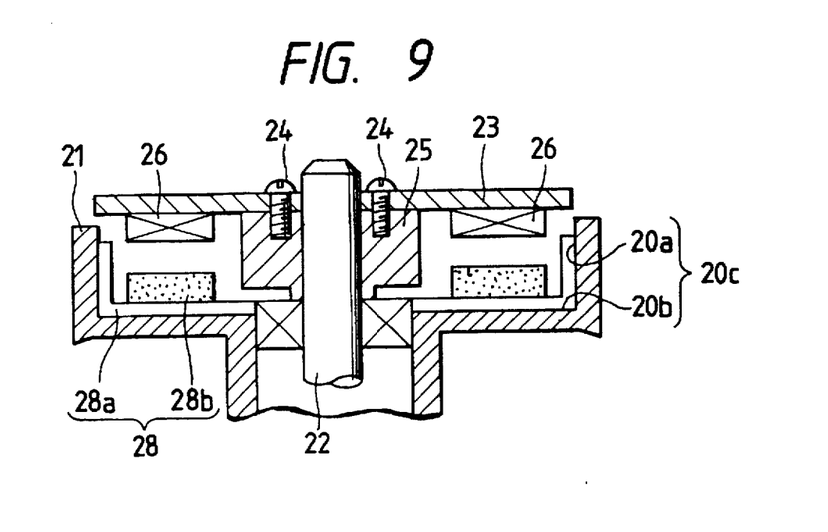

FIGS. 8 and 9 show examples of a rotary cylinder device using a planar confrontation motor. Similarly as in the cases of the above-described first through fourth embodiments, the rotary cylinder device comprises: a rotary cylinder 4 having a magnetic head 7; a stationary cylinder 1 secured to the base of a signal recording and reproducing device such as a video tape recorder; and connecting means, namely, a rotary transformer 8 for transmitting signals detected by the magnetic head 7 to a stationary circuit, and transmitting control signals and recording signals to the rotary section.

A boss 9 is fixedly mounted on a stationary shaft 2 in such a manner that it is located above the rotary cylinder 4. A circuit board 10, on which a drive circuit for rotating the motor M and other circuits are formed, is secured to the upper surface of the boss 9 with screws 11.

The circuit board 10 serves as a magnetic shielding member. A plurality of drive coils 26 forming the stator section of the motor M are mounted on the lower surface of the circuit board 10 which confronts with the opening of the rotary cylinder 4. A rotary magnet assembly 27 is formed on the bottom of a rotor yoke 15 in such a manner that it confronts with the drive coils 26.

In the fifth embodiment, too, the rotor yoke 15 is in the form of a dish which is opened upwardly in FIG. 8. More specifically, the cylindrical wall of the rotor yoke 15 is extended towards the magnetic shielding member, namely, the circuit board 15. Therefore, the rotor yoke 15 performs a magnetic shielding function in cooperation with the rotary cylinder 4.

The magnetic shielding member may be made of a ferromagnetic material similarly as in the above-described embodiments; that is, it may be of a magnetic shielding material such as an iron plate.

The central portion of the bottom of the rotor yoke 15 is secured to the upper surface of the rotary cylinder 4 with screws 17.

The drive coils 26 are excited to turn the rotor magnet assembly 27, so that the rotary cylinder 4 is turned through the rotor yoke 15.

The rotary cylinder device shown in FIG. 8 may be modified as shown in FIG. 9, in which parts corresponding functionally to those which have been described with reference to FIGS. 5 through 7 are therefore designated by the same reference numerals or characters. That is, the device of FIG. 9 has a rotor magnet section 28, which comprises a bottomed cylindrical rotor yoke 28a, and a rotor magnet assembly 28a secured to the bottom of the rotor yoke 28 in such a manner that it confronts with the drive coils 26.

In the rotary cylinder device of the invention, the components of the motor M are arranged between the rotor yoke secured to the upper surface of the rotary cylinder and the magnetic shielding member. Hence, the magnetic members around the motor M are protected from being affected by the magnetic flux of the latter M. That is, the difficulties caused by leakage flux from the motor (i.e., a variety of magnetic noise and deterioration of the (recorded signal), can be eliminated with the above-specified features of the stationary shaft type rotary cylinder device. Hence, when equipped with the rotary cylinder device of the invention, a video tape recorder or the like is improved in performance.

Furthermore, in the rotary cylinder device of the invention, the magnetic shielding member is provided between the lower portion of the rotary cylinder, to which the magnetic -head is secured, and the upper portion to which the rotor yoke with the rotor magnet assembly is secured. Hence, the magnetic head is protected from being affected by the magnetic flux formed at the upper portion of the rotary cylinder.

In addition, in the rotary cylinder device of the invention, the supporting member fixedly mounted on the stationary shaft has a placing section with a flat surface which is perpendicular to the stationary shaft, and at least a part of the stator core of the motor is mounted on the placing section of the supporting member. Therefore, the stator core is secured to the supporting member with high rigidity. Furthermore, this structure dispenses with the use of the screws for the circuit board, which significantly reduces the axial dimension of the device.

The provision of the motor inside the rotary cylinder contributes to a reduction of the axial dimension of the device. Therefore, the rotary cylinder device of the invention is smaller in thickness than the conventional stationary shaft type rotary cylinder device.

Moreover, in the rotary cylinder device of the invention, the rotor magnet assembly is fixedly fitted in the cylindrical wall of the rotary cylinder without screws. Therefore the device has fewer components and is less expensive.

In the motor M, its rotor yoke is fixedly secured with the screws. Hence, none of the screws become loosened even when the rotary cylinder turns. Thus, the stator section is positively fixed, and accurately positioned with respect to the rotor section. Therefore, the motor is maintained high in operating efficiency.

What is claimed is:

1. A rotary cylinder device comprising:

a stationary cylinder with a stationary shaft having a longitudinal axis;

a rotary cylinder rotatably mounted on the stationary shaft, the rotary cylinder being substantially cup-shaped so as to have an opening on a first longitudinal side thereof which is opposite to a second longitudinal side where the rotary cylinder confronts with the stationary cylinder;

a signal recording and reproducing magnetic head provided on the periphery of the second longitudinal side of the rotary cylinder;

an electric motor including:

a rotor member which is provided in said opening of the rotary cylinder and secured to the rotary cylinder, said rotor member including a rotor magnet;

a stator member which is confronted with the rotor magnet of the rotor member in a radial direction of said stationary shaft such that said stator member is concentric with said rotor member;

a first magnetic shielding member arranged to cover said opening of the rotary cylinder; and a second magnetic shielding member means, provided on an inner cylindrical surface of the rotary cylinder, for shielding the magnetic head from leakage flux from the electric motor, said second magnetic shielding member means being bridged from said inner cylinder surface to a bottom internal surface of said cupshaped rotary cylinder and being positioned between said magnetic head and said rotor member.

2. A rotary cylinder device as claimed in claim 1, wherein the first magnetic shielding member is of a ferromagnetic material.

3. A rotary cylinder device as claimed in claim 1, wherein the first magnetic shielding member is a circuit board provided for rotating the electric motor.

4. A rotary cylinder device as claimed in claim 1, wherein the second magnetic shielding member means is in an annular shape.

5. A rotary cylinder device, as claimed in claim 1, further comprising:

a supporting member secured to the stationary shaft on the first side of the rotary cylinder in an interior portion of the rotary cylinder, the supporting member having a placing portion made up of a flat surface, on which at least a part of the stator member of the electric motor is placed.

6. A rotary cylinder device as claimed in claim 5, wherein the stator member of the electric motor includes a stator core, and a part of the stator core is placed on the placing portion of the supporting member.

7. A rotary cylinder device as claimed in claim 6, wherein the stator core and a core holder secured to the stator core which form the stator member of the electric motor, a circuit board having a drive circuit for rotating the electric motor, and the placing portion on which the stator core is mounted, are fixedly secured with screws.

8. A rotary cylinder device as claimed in claim 6, wherein said stator core has a recess portion, through which the stator core is mounted on the placing portion of the supporting member.

9. A rotary cylinder device as claimed in claim 1, wherein the rotor member of the electric motor is fitted in a cylindrical wall of the rotary cylinder.

10. A rotary cylinder device as claimed claim 9, wherein the rotor member includes a yoke and magnet.

11. A rotary cylinder device as claimed in claim 1, wherein the rotary cylinder has a mounting piece therein, to which the rotor member of the electric motor is secured.

12. A rotary cylinder device as claimed claim 11, wherein the rotor member includes a yoke and magnet.

* * * * *